United States Patent
Taki et al.

(10) Patent No.: US 8,174,778 B2
(45) Date of Patent: May 8, 2012

(54) METHOD OF PRODUCING MOLDED CERAMIC PRODUCT, MOLDED CERAMIC PRODUCT AND IMAGE-TAKING APPARATUS

(75) Inventors: Ikuo Taki, Odawara (JP); Yuya Sakai, Saitama (JP)

(73) Assignee: Fujifilm Corporation, Tokyo (JP)

( * ) Notice: Subject to any disclaimer, the term of this patent is extended or adjusted under 35 U.S.C. 154(b) by 423 days.

(21) Appl. No.: 12/559,802

(22) Filed: Sep. 15, 2009

(65) Prior Publication Data

US 2010/0079880 A1 Apr. 1, 2010

(30) Foreign Application Priority Data

Sep. 30, 2008 (JP) ................................. 2008-254775

(51) Int. Cl.
G02B 7/02 (2006.01)
(52) U.S. Cl. ........................................ 359/829; 359/819
(58) Field of Classification Search .................. 359/811, 359/819, 823, 829; 313/118; 264/1.21, 267, 264/269, 604, 645, 667; 65/374.15, 414; 285/230, 355, 423; 215/334, 335; 411/303
See application file for complete search history.

(56) References Cited

U.S. PATENT DOCUMENTS

| | | | |
|---|---|---|---|
| 2,766,054 A * | 10/1956 | Everhart | 285/230 |
| 3,294,139 A * | 12/1966 | Preziosi | 411/303 |
| 3,560,080 A | 2/1971 | Wilczynski et al. | |
| 3,678,178 A * | 7/1972 | Hubbauer et al. | 174/152 R |
| 4,281,916 A | 8/1981 | Aoyagi | |
| 5,502,598 A | 3/1996 | Kimura et al. | |
| 5,523,815 A | 6/1996 | Tamura | |
| 5,535,638 A * | 7/1996 | Willison | 74/424.84 |
| 5,719,711 A | 2/1998 | Shiba | |
| 5,736,912 A * | 4/1998 | Mikami et al. | 333/235 |
| 5,781,351 A | 7/1998 | Murakami et al. | |
| 5,864,739 A | 1/1999 | Kaneko et al. | |
| 6,144,509 A | 11/2000 | Baker | |
| 6,424,473 B1 | 7/2002 | Nakane et al. | |
| 7,576,930 B2 | 8/2009 | Yu | |
| 7,914,353 B2 * | 3/2011 | Kobayashi et al. | 445/7 |
| 2001/0040740 A1 | 11/2001 | Funakoshi | |

(Continued)

FOREIGN PATENT DOCUMENTS

JP 1-243245 9/1989

(Continued)

OTHER PUBLICATIONS

Office Action dated Oct. 15, 2009 issued in co-pending U.S. Appl. No. 12/404,017.

(Continued)

*Primary Examiner* — Loha Ben
(74) *Attorney, Agent, or Firm* — Birch, Stewart, Kolasch & Birch, LLP

(57) ABSTRACT

Ceramic is molded to produce a molded ceramic product, using a mold that has a portion for forming the trough of a first thread formed on the molded ceramic product. The trough of the first thread is higher than the crest of a second thread formed on a mating component to be engaged with the first thread. Subsequently, the molded ceramic is fired. The trough of the first thread formed on the molded ceramic product thus produced has a depth that allows the trough of the first thread to avoid interference with the crest of the second thread of the mating component.

13 Claims, 8 Drawing Sheets

U.S. PATENT DOCUMENTS

| | | |
|---|---|---|
| 2004/0197038 A1 | 10/2004 | Fujita et al. |
| 2006/0152826 A1 | 7/2006 | Tsutsui |
| 2006/0204781 A1 | 9/2006 | Takei |
| 2007/0076309 A1 | 4/2007 | Shimizu et al. |
| 2007/0188699 A1 | 8/2007 | Cech et al. |
| 2007/0191209 A1 | 8/2007 | Hyuga et al. |
| 2008/0031103 A1 | 2/2008 | Horinouchi et al. |
| 2008/0055754 A1 | 3/2008 | Sakamoto |
| 2008/0070815 A1 | 3/2008 | Kamada et al. |
| 2008/0252775 A1 | 10/2008 | Ryu et al. |
| 2009/0103193 A1 | 4/2009 | Berube |
| 2009/0244726 A1 | 10/2009 | Sakai et al. |

FOREIGN PATENT DOCUMENTS

| | | |
|---|---|---|
| JP | 2000-357333 | 12/2000 |
| JP | 2001-027723 | 1/2001 |
| JP | 2002-23091 A | 1/2002 |
| JP | 2006-284991 A | 10/2006 |
| JP | 2006-292927 A | 10/2006 |
| JP | 2007-094242 | 4/2007 |
| JP | 2007-199235 | 8/2007 |
| JP | 2007-238430 A | 9/2007 |
| JP | 2007-279557 A | 10/2007 |
| JP | 2008-254769 | 9/2008 |
| JP | 2008-254771 | 9/2008 |
| JP | 2008-254772 | 9/2008 |
| JP | 2008-254773 | 9/2008 |
| JP | 2009-206117 | 9/2008 |
| JP | 2008-88528 A | 10/2009 |
| JP | 2009-296542 | 12/2009 |

OTHER PUBLICATIONS

Notice of Allowance issued in copending U.S. Appl. No. 12/559,699 dated May 25, 2011.

Notice of Allowance issued in copending U.S. Appl. No. 12/559,718 dated May 23, 2011.

Notice of Allowance issued in copending U.S. Appl. No. 12/559,783 dated May 13, 2011.

Office Action dated Jun. 23, 2011 for U.S. Appl. No. 12/559,680.

Chen Jianmin et al., "Developing Situation and Application of Bonded Solid Lubricant Films", Tribology, vol. 14, No. 2, pp. 180-189, Apr. 1994.

Chinese Office Action issued on Dec. 31, 2010 in Chinese Patent Application No. 200910253004 X corresponding to U.S. Appl. No. 12/559,718.

Chinese Office Action issued on Jan. 11, 2011 in Chinese Application No. 200910205755.4 corresponding to U.S. Appl. No. 12/559,699.

JPO Notification issued on Apr. 6, 2011 in foreign counterpart application JP 2008-254769 of co-pending U.S. Appl. No. 12/559,783.

Notice of Allowance issued in U.S. Appl. No. 12/559,783 on Jan. 6, 2011.

U.S. Office Action issued in U.S. Appl. No. 12/559,680 on Dec. 27, 2010.

U.S. Office Action issued in U.S. Appl. No. 12/559,699 on Dec. 29, 2010.

U.S. Office Action issued in U.S. Appl. No. 12/559,718 on Feb. 2, 2011.

* cited by examiner

METHOD OF PRODUCING MOLDED CERAMIC PRODUCT, MOLDED CERAMIC PRODUCT AND IMAGE-TAKING APPARATUS

BACKGROUND OF THE INVENTION

1. Field of the Invention

The present invention relates to a method of producing a molded ceramic product, the molded ceramic product produced by this method, and an image-taking apparatus mounted with the molded ceramic product.

2. Description of the Related Art

In recent years, automobiles have been provided with cameras. Meanwhile, nowadays, automobiles are equipped with display screens thanks to the widespread use of car navigation systems. Therefore, many of cameras installed in automobiles can display the state of a blind spot for a driver on a display screen provided in front of the driver's seat.

Incidentally, automobiles may be left outdoors in hot summer and in freezing winter and therefore, a camera installed in an automobile is required to operate properly over an extremely wide range of temperatures. In order to guarantee the proper operation of a vehicle-mounted camera, a lens assembly employed in such a camera needs to be not only lightweight and robust as generally required, but also resistant to stretching and shrinking with temperature for the purpose of preventing the occurrence of a blur due to a change in temperature. To meet these needs, ceramic barrels have been devised (see, for example, Japanese Patent Application Publications No. 2006-284991 and No. 2006-292927). Also, the inventors of the present application have proposed to apply porous ceramic to an optical component (see, for example, Japanese Patent Application Publication No. 2007-238430). The porosity of the porous body described in the specification of Japanese Patent Application Publication No. 2007-238430 is equal to or more than 10%.

Further, for instance, Japanese Patent Application Publication No. 2007-279557 describes a lens assembly having such a structure that lenses and spacing rings are inserted into a lens barrel through the front opening of the lens barrel, and a pressing ring is threaded on a front part of the lens barrel, thereby fixing the lenses to the lens barrel. A structure in which a ceramic barrel is applied to the structure of Japanese Patent Application Publication No. 2007-279557 will be described.

FIG. 1 is a diagram that illustrates an example of the structure of a lens assembly provided with a ceramic barrel.

A lens assembly 1 illustrated in FIG. 1 is provided with a barrel 10, and the barrel 10 has a hollow part 100 having an object-side opening 101 and an image-forming-side opening 102. Formed on an object-side periphery of the barrel 10 is a male thread SR1. From the object-side opening 101, lenses L1 trough L4 and spacing rings SP1 through SP3 are inserted while being aligned along the optical axis. These elements L1 through L4 and SP1 through SP3 may be collectively referred to as optical members. In this example, the lenses L1 trough L4 and the spacing rings SP1 through SP3 are alternately disposed and sequentially inserted into the hollow part 100 of the barrel 10.

Furthermore, the lens assembly 1 illustrated in FIG. 1 is provided with a pressing ring 11 that fixes the optical members L1 through L4 and SP1 through SP3 inserted into the hollow part 100 of the barrel 10, by pressing these optical members from the side where the object-side opening 101 is formed. The pressing ring 11 has: a mounting opening 110 into which an object-side part of the barrel 10 is inserted; and an optical opening 111 for making a central part of the lens L1 exposed. Among the optical members inserted into the barrel, the lens L1 is the one disposed at the position closest to the object. Formed on an inner wall on a mounting opening side of the pressing ring 11 is a female thread SR2 in which the male thread SR1 is engaged. When the male thread SR1 is engaged in the female thread SR2, the edge of an object-side surface of the lens L1 disposed at the position closest to the object on the object side is pressed by the pressing ring 11.

The lens assembly 1 shown in FIG. 1 is assembled by using the pressing ring 11 that presses the lenses L1 trough L4 and the spacing rings SP1 through SP3 in the barrel 10 toward the image-forming-side opening.

As mentioned above, the lens assembly may be installed in an automobile. Considering this fact, it is conceivable to employ a molded ceramic product as the barrel 10 of the lens assembly 1 illustrated in FIG. 1. When a molded ceramic product is employed as the barrel 10 of the lens assembly 1 illustrated in FIG. 1, a thread must be formed on the molded ceramic product by molding so that the molded ceramic product can be threaded into the pressing ring 11.

In this type of ceramic component, a thread part may be formed by cutting or the like, which requires processing time and cost. In contrast, when a thread part is formed by injection molding, processing for forming the thread part is eliminated, which is advantageous in view of processing time and cost. Nevertheless, if the molded product obtained by the injection molding is fired, there occurs such a problem that the crest of a thread is rounded off because a firing reaction takes place after mixed resin comes out of the molded product.

FIG. 2 is a diagram showing the structures of the thread SR1 of the barrel 10 and the thread SR2 of the pressing ring 11.

As mentioned above, when the molded product is fired after the thread part is formed by the injection molding, a firing reaction occurs after the resin comes out of the molded product. Therefore, the crest and trough of the thread are inevitably rounded as illustrated in part (a) of FIG. 2. As illustrated in part (b) of FIG. 2, when the bottom of the trough of the barrel 10 made of ceramic is rounded, the corresponding crest of the pressing ring 11 made of, for example, aluminum cannot be engaged in this trough of the barrel 10.

SUMMARY OF THE INVENTION

In view of the above circumstances, the present invention provides: a method of producing a molded ceramic product whose thread required for engagement into a thread of a mating component is reliably molded; the molded ceramic product produced by this method; and an image-taking apparatus mounted with the molded ceramic product.

According to the present invention, a method of producing a molded ceramic product on which a first thread is formed includes:

molding ceramic using a mold having a part for forming a trough of the first thread, the part being higher than a crest of a second thread formed on a mating component to be engaged in the first thread; and firing the molded ceramic.

According to the method of producing a molded ceramic product of the present invention, after the ceramic is molded with a mold having a part for forming the trough of the first thread, which part is higher than the crest of the second thread formed on a mating component to be engaged in the first thread, the molded ceramic is fired.

When such a mold is used, the trough of the first thread can receive the sharp crest of the second thread of the mating component, even if the trough of the first thread of the fired molded ceramic product becomes limp and rounded.

In other words, there is realized a method of producing a molded ceramic product in which a thread required for firm engagement with the thread of a mating component is reliably formed.

Here, the ceramic may be porous.

The "porous" ceramic has a porosity equal to or more than 10%.

A molded ceramic product on which a first thread is formed according to the present invention is product, in which:

a trough of the first thread has a depth that allows the trough of the first thread to avoid interference with a crest of a second thread formed on a mating component to be engaged in the first thread.

The molded ceramic product described above is produced by the method of producing a molded ceramic product of the present invention and has a depth that allows the trough of the first thread of the molded ceramic product to avoid interference with the crest of the second thread of the mating component. Therefore, the crest of the second thread is smoothly engaged in the trough of the first thread of the molded ceramic product.

Further, the first thread may have a crest whose height enables the crest of the first thread to avoid interference with a trough of the second thread.

The crest of the molded ceramic product has a height that allows this crest to avoid interference with the trough of the thread formed on the mating component, even when this crest is formed by a mold having a size that allows engagement in the trough of the second thread.

Here, the molded ceramic product may be made of porous ceramic.

Further, in the molded ceramic product according to the present invention, it is acceptable that the molded ceramic product is a barrel made of ceramic and having an object-side opening and an image-forming-side opening, a male thread is formed as the first thread on an object-side outer wall of the barrel, and the ceramic barrel has a plurality of optical members aligned along an optical axis and inserted into the barrel from the object-side opening, and the mating component is a pressing ring that has a mounting opening into which an object-side part of the barrel is inserted and an optical opening which exposes a central portion of a first optical member positioned closest to an object among the plurality of optical members inserted into the barrel, a female thread is formed as the second thread on an inner wall inside the mounting opening to be engaged with the male thread, and the pressing ring presses an edge of an object-side surface of the first optical member by engagement between the male thread and the female thread.

An image-taking apparatus according to the present invention includes:

a barrel made of ceramic and having an object-side opening, an image-forming-side opening, and a male thread formed on an object-side outer wall of the barrel, the barrel including:

a plurality of optical members aligned along an optical axis and inserted into the barrel from the object-side opening to form an image-forming optical system, and a pressing ring that has a mounting opening into which an object-side part of the barrel is inserted and an optical opening which exposes a central portion of a first optical member positioned closest to an object among the plurality of optical members inserted into the barrel, the pressing ring having a female thread formed on an inner wall of the mounting opening to be engaged with the male thread, in which a trough of the male thread has a depth that allows the trough of the male thread to avoid interference with a crest of the female thread of the pressing ring, and the pressing ring presses an edge of an object-side surface of the first optical member by engagement between the male thread and the female thread; and an imaging device disposed at an image-forming surface of the image-forming optical system.

In the image-taking apparatus of the present invention, advantages of the molded ceramic product produced by the method of producing molded ceramic product of the present invention are obtained.

DETAILED DESCRIPTION OF THE INVENTION

An embodiment of the present invention will be described.

Figure 3:
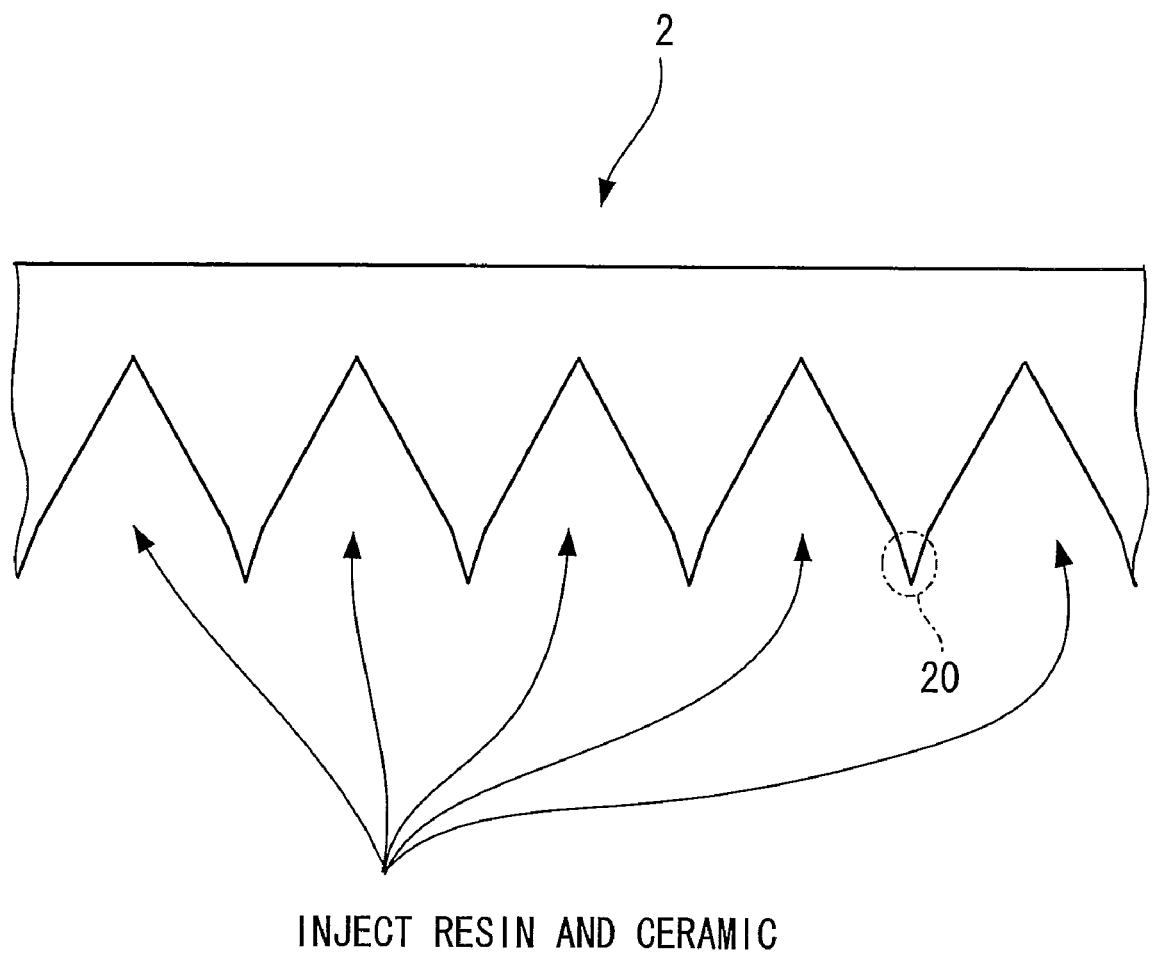
FIG. 3 is a diagram for describing a method of producing a molded ceramic product.
Figure 4:
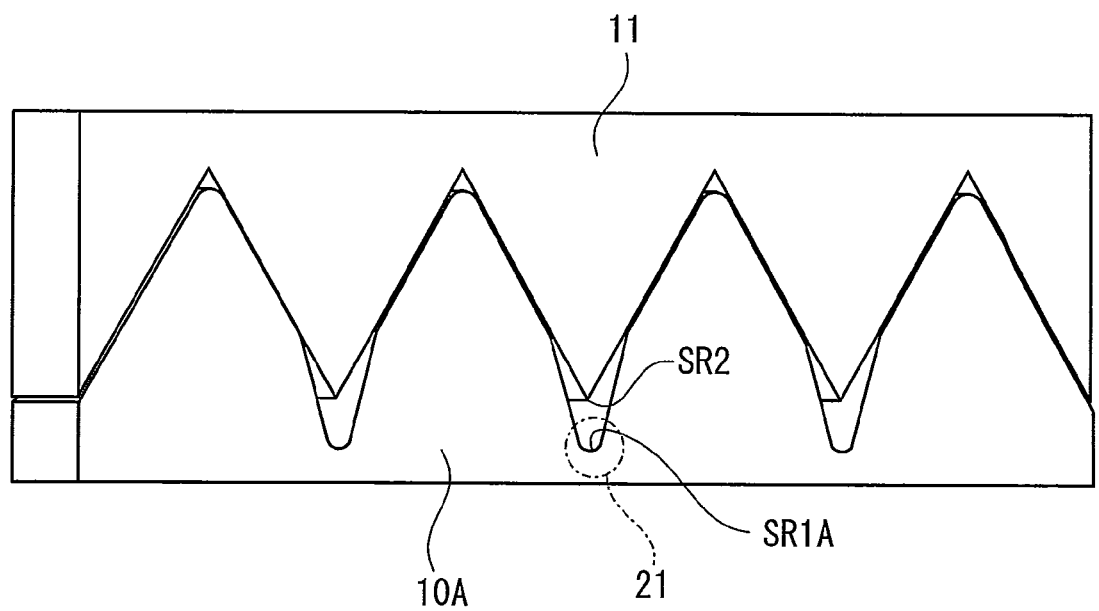
FIG. 4 is a diagram illustrating the structure of a thread part of the molded ceramic product produced by the method in FIG. 3.

FIG. 3 is a diagram for describing a method of producing a molded ceramic product, and FIG. 4 is a diagram illustrating the structure of a thread part of the molded ceramic product produced by this method.

FIG. 3 illustrates the structure of a mold 2 for forming the thread on the molded ceramic product.

The mold 2 illustrated in FIG. 3 has a portion 20 for forming the trough of the thread. The portion 20 is higher than the crest of the thread formed on a mating component, which thread is to be engaged with the thread whose trough is formed by the portion 20. As a result, the depth of the trough of the thread formed on the molded ceramic product is greater than the height of the crest of the thread formed on the mating component. When a barrel 10A is produced by molding and firing ceramic using the mold 2, a male thread SR1A of the barrel 10A has a trough part 21 as illustrated in FIG. 4. The trough part 21 of the male thread SR1A has a depth that allows the trough part 21 to avoid interference with the crest of the thread formed on the mating component, averting interference that occurs in conventional techniques. Incidentally, even when the mold 2 depicted in FIG. 3 has a conventional shape of a part for forming the crest of the molded ceramic product, the formed crest of this molded ceramic product is preferably rounded to fit into the trough of the mating component.

Figure 5:
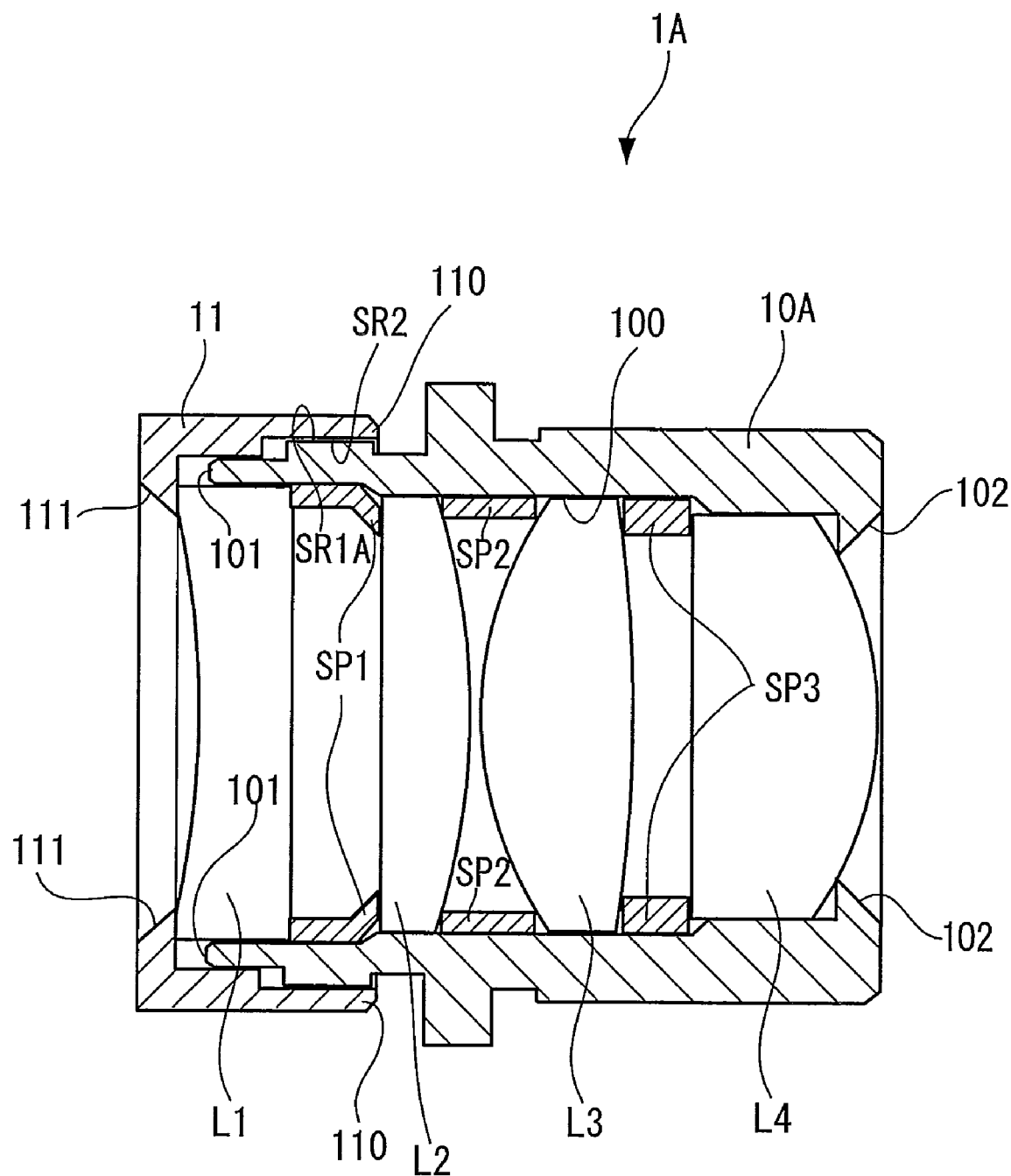
FIG. 5 is a diagram illustrating a lens assembly 1A provided with a barrel 10A produced using a mold shown in FIG. 3.

FIG. 5 is a diagram illustrating a lens assembly 1A provided with the barrel 10A produced using the mold 2 shown in FIG. 3.

Figure 1:
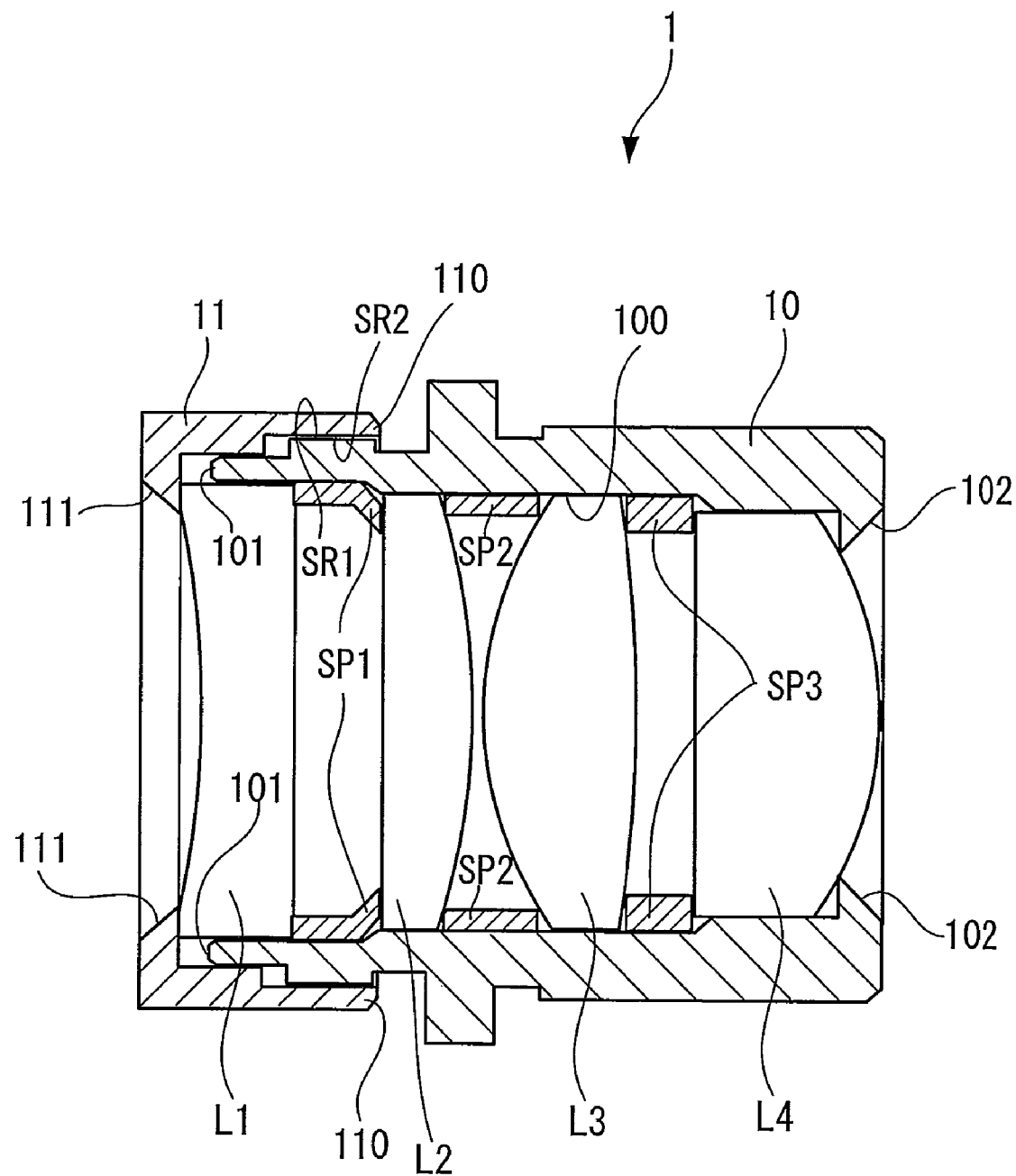
FIG. 1 is a diagram that illustrates an example of the structure of a lens assembly provided with a ceramic barrel.
Figure 2:
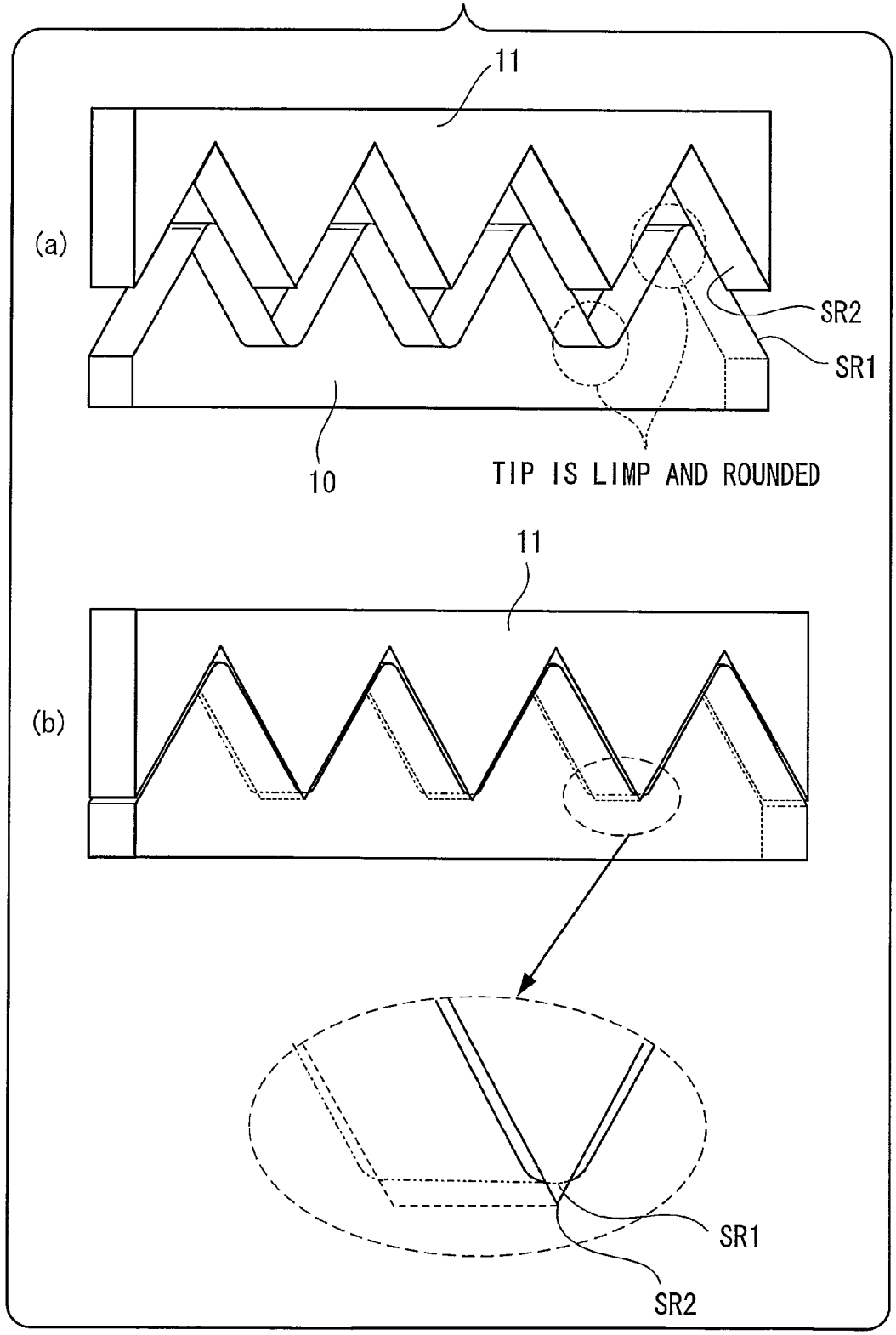
FIG. 2 is a diagram showing the structures of a thread SR1 of a barrel 10 and a thread SR2 of a pressing ring 11.

FIG. 5 illustrates the same structure as that depicted in FIG. 1.

When the barrel 10A made of ceramic and produced using the mold 2 whose structure is shown in FIG. 3 is used, a female thread SR2 of a pressing ring 11 can be securely fastened to the male thread SR1A of the barrel 10A.

Now, there will be described an example in which the lens assembly 1A illustrated in FIG. 5 is applied to an image-taking apparatus.

Figure 6:
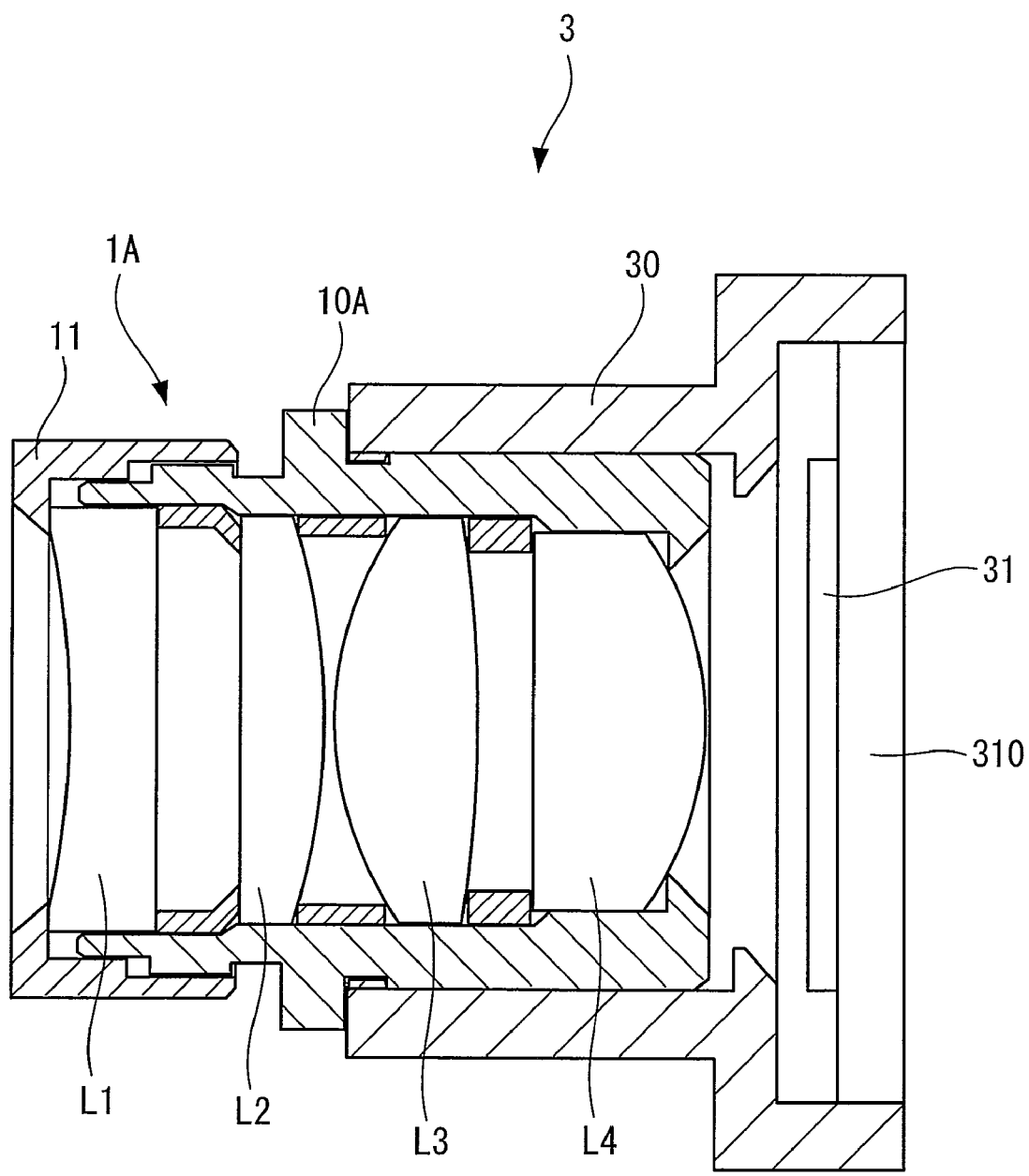
FIG. 6 is a diagram illustrating a camera unit 3 into which the lens assembly 1A illustrated in FIG. 5 is incorporated.

FIG. 6 is a diagram illustrating a camera unit 3 into which the lens assembly 1A illustrated in FIG. 5 is incorporated.

FIG. 6 illustrates a cross section of the camera unit 3, taken along an optical axis.

The camera unit 3 illustrated in FIG. 4 includes the lens assembly 1A illustrated in FIG. 5, a camera main-unit frame 30, and an imaging device 31. The imaging device 31 is implemented on an imaging-device board 310 and fixed with adhesion to the camera main-unit frame 30. An outer surface of the barrel 10A of the lens assembly 1A shown in FIG. 5 and an inner surface of the camera main-unit frame 30 are respectively provided with thread parts.

When the camera unit 3 is assembled, at first, the lens assembly 1A shown in FIG. 5 is threaded into the camera main-unit frame 30 and then, the lens assembly 1A is fixed to the camera main-unit frame 30 with adhesion. Subsequently, the imaging-device board 310 mounted with the imaging device 31 such as a CCD solid-state imaging device is bonded to the camera main-unit frame 30 with adhesion, so that the imaging-device board 310 is positioned at an image-forming surface of an image-forming optical system formed by the lenses inserted into the barrel 10A of the lens assembly 1A. By going through this simple procedure, the lens assembly 1A illustrated in FIG. 3 can be incorporated into the camera unit 3.

There is another type of a thread whose crest and trough are trapezoidal.

Figure 7:
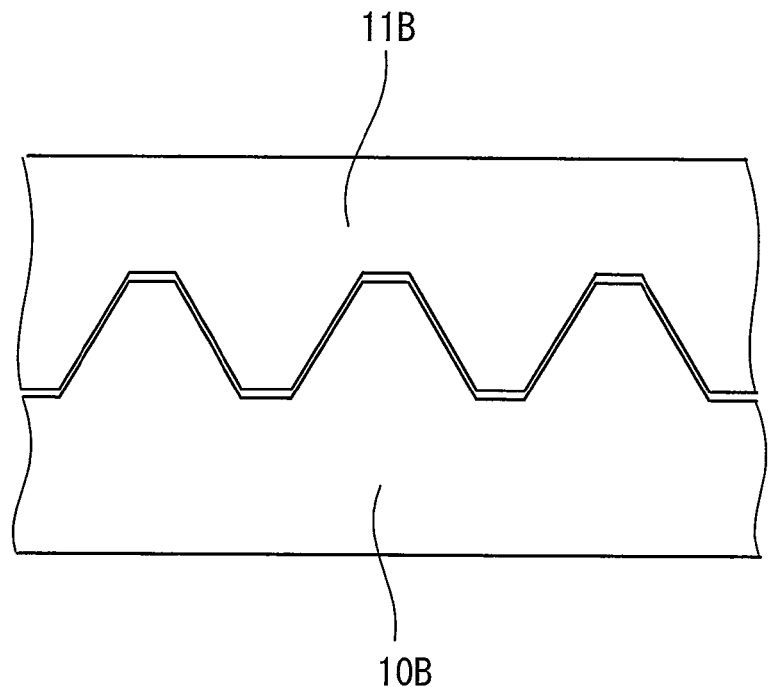
FIG. 7 is a conceptual drawing of thread parts having trapezoidal threads and fastened to each other.
Figure 8:
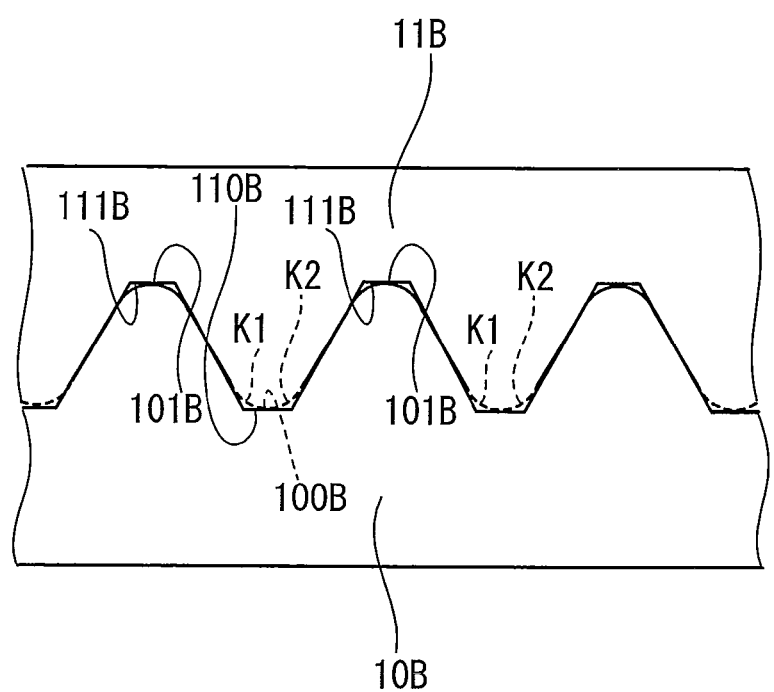
FIG. 8 is a diagram for describing a problem that occurs when a thread part of a molded ceramic product produced with a mold having the same shape as that shown in FIG. 7 is engaged with a thread part of a metal product.

FIG. 7 is a conceptual drawing of thread parts having trapezoidal threads and fastened to each other. Further, FIG. 8 is a diagram for describing a problem that occurs when a thread part of a molded ceramic product 10B produced by a mold having the same shape as that shown in FIG. 7 is engaged with a thread part of a metal product 11B. Furthermore, FIG. 9 is a diagram illustrating the structure of a mold 2B for forming a molded ceramic product produced to solve the problem, and FIG. 10 is a diagram illustrating a state in which a thread part of a molded ceramic product 10B1 produced using the mold 2B shown in FIG. 9 is fastened to a metal thread part.

In FIG. 8, in order to distinguish the trough and crest of the thread formed on the molded ceramic product 10B, which is conventional, from each other, the trough is indicated with a reference character 100B and the crest is indicated with a reference character 101B. Similarly, the crest and trough of the thread part of the metal product 11B are indicated with reference characters 110B and 111B, respectively.

As illustrated in FIG. 8, when the thread part of the metal product 11B produced by the mold having the same shape as that shown in FIG. 7 is fastened to the thread part of the molded ceramic product 10B, two peaks K1 and K2 of the trough 100B in the thread part of the molded ceramic product 10B are rounded because of the reason described above. Accordingly, the crest 110B, which is sharp, of the thread part of the metal product 11B cannot be fit into the trough 100B of the molded ceramic product 10B.

Figure 9:
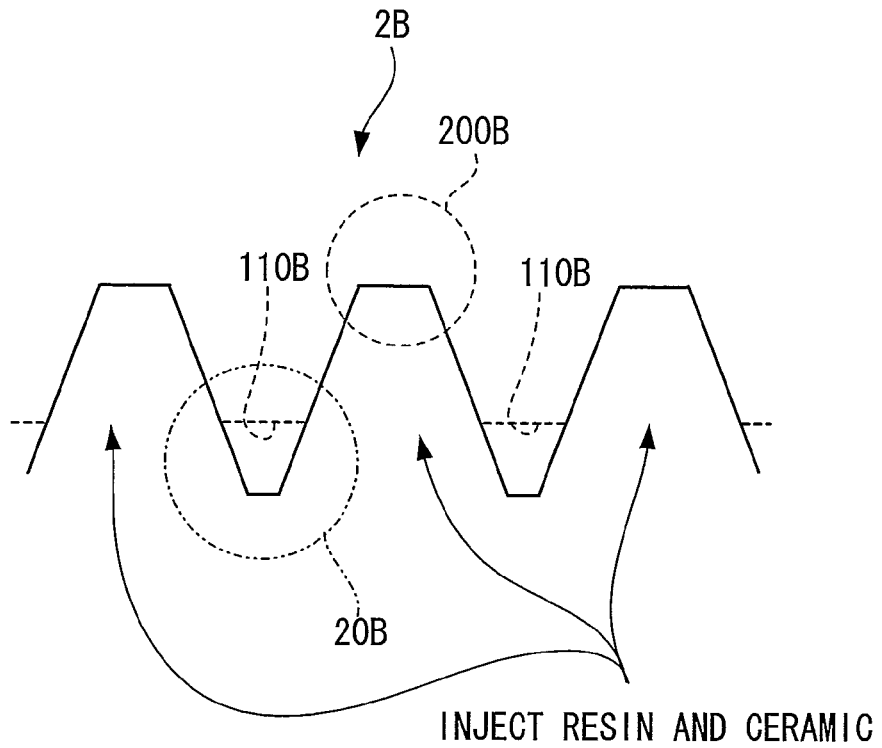
FIG. 9 is a diagram illustrating the structure of a mold for forming a molded ceramic product produced to solve the problem described with reference to FIG. 8.
Figure 10:
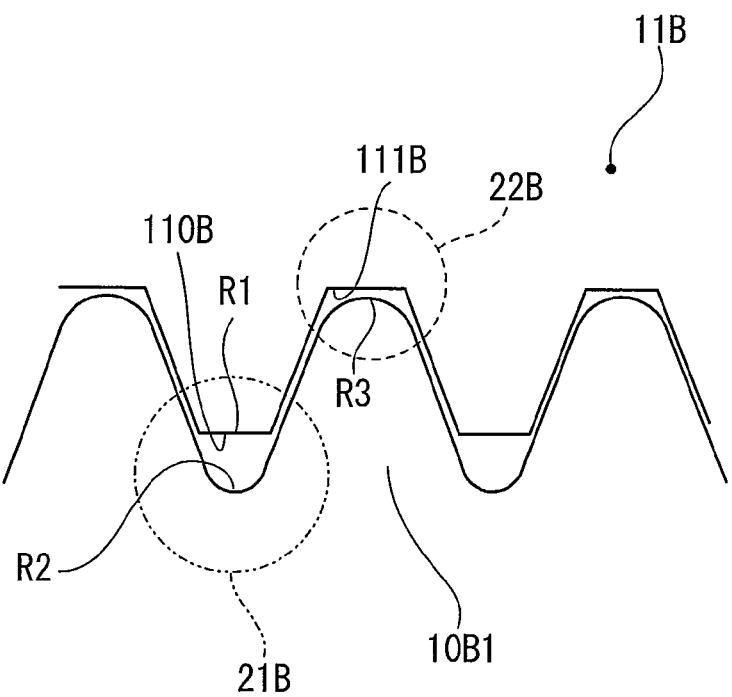
FIG. 10 is a diagram illustrating a state in which a thread part of a molded ceramic product produced using the mold shown in FIG. 9 is fastened to a metal thread part.

To address this problem, the mold 2B having the shape shown in FIG. 9 is provided to form the molded ceramic product 10B1, avoiding interference like that between the crest 110B of the thread of the metal component 11B and the trough 100B of the thread of the molded ceramic product 10B shown in FIG. 8.

The mold 2B illustrated in FIG. 9 has a portion 20B for forming the trough of the thread part of the molded ceramic product 10B1. The portion 20B projects so as to cover the tip of a crest 110B in the thread part of the mating component (the metal component 11B) to be fit into the thread part formed by the mold 2B. The gradient of the projecting part of the portion 20B is the same as the gradient of the crest 110B in the thread part of the metal component 11B. Also, a portion 200B for forming the crest 101B of the thread part of the molded ceramic product 10B1 has the same shape as that of a trough 111B of the mating component (see FIG. 10).

When the thread part of the molded ceramic product 10B1 is formed by the mold 2B shown in FIG. 9 and fired, the peaks are rounded as described above. Also, as illustrated in FIG. 10, since a size R1 is applied to the crest 110B of the (metal) thread of the mating component (the metal component 11B), a portion 21B of the trough is given a size R2 smaller than the size R1 and a portion 22B in the crest is provided with a size R3 suitable for accepting the trough 111B of the mating component.

Here, it is desirable that the size R2 of the trough in the thread part of the molded ceramic product 10B1 shown in FIG. 10 be approximately equal to or less than a half of the size R1 of the crest of the mating component (the metal component 11B). This makes it possible to achieve an excellent engagement state between the thread part of the mating component (the metal component 11B) and the thread part of the molded ceramic product 10B1, even when the thread part of this mating component is trapezoidal.

As described above, there are realized: a method of producing a molded ceramic product whose thread required for engagement into a thread of a mating component is reliably molded; the molded ceramic product produced by this method; and an image-taking apparatus mounted with the molded ceramic product.

What is claimed is:

1. A method of producing a molded ceramic product on which a first thread is formed, the method comprising:
   molding ceramic using a mold having a part for forming a trough of the first thread, the part being higher than a crest of a second thread formed on a mating component to be engaged in the first thread; and
   firing the molded ceramic.

2. The method according to claim 1, wherein the ceramic is porous.

3. A molded ceramic product on which a first thread is formed, wherein:
   a trough of the first thread has a depth that allows the trough of the first thread to avoid interference with a crest of a second thread formed on a mating component to be engaged in the first thread.

4. The molded ceramic product according to claim 3, wherein the first thread has a crest whose height enables the crest of the first thread to avoid interference with a trough of the second thread.

5. The molded ceramic product according to claim 4, wherein the molded ceramic product is made of porous ceramic.

6. The molded ceramic product according to claim 5, wherein the molded ceramic product is a barrel made of ceramic and having an object-side opening and an image-forming-side opening, a male thread is formed as the first thread on an object-side outer wall of the barrel, and the ceramic barrel has a plurality of optical members aligned along an optical axis and inserted into the barrel from the object-side opening, and the mating component is a pressing ring that has a mounting opening into which an object-side part of the barrel is inserted and an optical opening which exposes a central portion of a first optical member positioned closest to an object among the plurality of optical members inserted into the barrel, a female thread is formed as the second thread on an inner wall inside the mounting opening to be engaged with the male thread, and the pressing ring presses an edge of an object-side surface of the first optical member by engagement between the male thread and the female thread.

7. The molded ceramic product according to claim 4, wherein the molded ceramic product is a barrel made of ceramic and having an object-side opening and an image-forming-side opening, a male thread is formed as the first thread on an object-side outer wall of the barrel, and the ceramic barrel has a plurality of optical members aligned along an optical axis and inserted into the barrel from the object-side opening, and the mating component is a pressing ring that has a mounting opening into which an object-side part of the barrel is inserted and an optical opening which exposes a central portion of a first optical member positioned closest to an object among the plurality of optical members inserted into the barrel, a female thread is formed as the second thread on an inner wall inside the mounting opening to be engaged with the male thread, and the pressing ring presses an edge of an object-side surface of the first optical member by engagement between the male thread and the female thread.

8. The molded ceramic product according to claim 3, wherein the molded ceramic product is made of porous ceramic.

9. The molded ceramic product according to claim 8, wherein the molded ceramic product is a barrel made of ceramic and having an object-side opening and an image-forming-side opening, a male thread is formed as the first thread on an object-side outer wall of the barrel, and the ceramic barrel has a plurality of optical members aligned along an optical axis and inserted into the barrel from the object-side opening, and the mating component is a pressing ring that has a mounting opening into which an object-side part of the barrel is inserted and an optical opening which exposes a central portion of a first optical member positioned closest to an object among the plurality of optical members inserted into the barrel, a female thread is formed as the second thread on an inner wall inside the mounting opening to be engaged with the male thread, and the pressing ring presses an edge of an object-side surface of the first optical member by engagement between the male thread and the female thread.

10. The molded ceramic product according to claim 3, wherein the molded ceramic product is a barrel made of ceramic and having an object-side opening and an image-forming-side opening, a male thread is formed as the first thread on an object-side outer wall of the barrel, and the ceramic barrel has a plurality of optical members aligned along an optical axis and inserted into the barrel from the object-side opening, and the mating component is a pressing ring that has a mounting opening into which an object-side part of the barrel is inserted and an optical opening which exposes a central portion of a first optical member positioned closest to an object among the plurality of optical members inserted into the barrel, a female thread is formed as the second thread on an inner wall inside the mounting opening to be engaged with the male thread, and the pressing ring presses an edge of an object-side surface of the first optical member by engagement between the male thread and the female thread.

11. An image-taking apparatus comprising:

a barrel made of ceramic and having an object-side opening, an image-forming-side opening, and a male thread formed on an object-side outer wall of the barrel, the barrel including:

a plurality of optical members aligned along an optical axis and inserted into the barrel from the object-side opening to form an image-forming optical system, and a pressing ring that has a mounting opening into which an object-side part of the barrel is inserted and an optical opening which exposes a central portion of a first optical member positioned closest to an object among the plurality of optical members inserted into the barrel, the pressing ring having a female thread formed on an inner wall of the mounting opening to be engaged with the male thread, in which a trough of the male thread has a depth that allows the trough of the male thread to avoid interference with a crest of the female thread of the pressing ring, and the pressing ring presses an edge of an object-side surface of the first optical member by engagement between the male thread and the female thread; and an imaging device disposed at an image-forming surface of the image-forming optical system.

12. The image-taking apparatus according to claim 11, wherein the male thread has a crest with a height that allows the crest to avoid interference with a trough of the female thread.

13. The image-taking apparatus according to claim 11, wherein the barrel is made of porous ceramic.

* * * * *